(12) United States Patent
Kim et al.

(10) Patent No.: US 7,076,277 B2
(45) Date of Patent: Jul. 11, 2006

(54) BLUETOOTH HEADSET AND METHOD FOR INFORMING USER OF INCOMING CALL SIGNAL USING THE SAME

(75) Inventors: Jong Hwan Kim, Kyungki-do (KR); Young Jeong, Kyungki-do (KR)

(73) Assignee: Samsung Electro-Mechanics Co., LTD, Kyungki-Do (KR)

( * ) Notice: Subject to any disclaimer, the term of this patent is extended or adjusted under 35 U.S.C. 154(b) by 339 days.

(21) Appl. No.: 10/626,674

(22) Filed: Jul. 25, 2003

(65) Prior Publication Data

US 2004/0229658 A1   Nov. 18, 2004

(30) Foreign Application Priority Data

May 15, 2003   (KR) ..................... 10-2003-0031027

(51) Int. Cl.
*H04M 1/00* (2006.01)
(52) U.S. Cl. .................. 455/569.1; 455/550.1
(58) Field of Classification Search ............ 455/550.1, 455/569.1, 575.2, 575.3, 575.1, 575.6, 41.2, 455/41.3
See application file for complete search history.

(56) References Cited

U.S. PATENT DOCUMENTS

| | | | |
|---|---|---|---|
| 5,963,877 A | 10/1999 | Kobayashi | |
| 6,010,216 A * | 1/2000 | Jesiek | ......................... 351/158 |
| 6,192,221 B1 * | 2/2001 | Hasegawa | ................ 455/575.3 |
| 6,212,409 B1 | 4/2001 | Matsuo et al. | |
| 6,230,029 B1 * | 5/2001 | Hahn et al. | ............... 455/575.2 |
| 6,249,684 B1 * | 6/2001 | Hasegawa | ................ 455/575.3 |
| 6,269,259 B1 | 7/2001 | Lai | |
| 2002/0067825 A1 | 6/2002 | Baranowski et al. | |
| 2002/0111140 A1 * | 8/2002 | Kim | ............................ 455/41 |
| 2002/0111197 A1 * | 8/2002 | Fitzgerald | .................... 455/568 |
| 2003/0119565 A1 * | 6/2003 | Lin | ............................. 455/569 |
| 2004/0204207 A1 * | 10/2004 | Parker | ..................... 455/575.2 |
| 2005/0107131 A1 * | 5/2005 | Abramov | ................ 455/569.1 |
| 2005/0153748 A1 * | 7/2005 | Bodley | .................... 455/569.1 |
| 2005/0208980 A1 * | 9/2005 | Tsai et al. | ................ 455/569.1 |

FOREIGN PATENT DOCUMENTS

| | | |
|---|---|---|
| EP | 1005241 | 5/2000 |
| EP | 1111885 | 6/2001 |
| GB | 2365692 | 2/2002 |
| KR | 120590 | 4/1998 |
| KR | 2003-0010213 | 2/2003 |
| WO | WO03/055183 | 7/2003 |
| WO | WO 2004/084529 | 9/2004 |

* cited by examiner

*Primary Examiner*—Edward F. Urban
*Assistant Examiner*—Christian A. Hannon
(74) *Attorney, Agent, or Firm*—Lowe Hauptman & Berner, LLP

(57) ABSTRACT

A Bluetooth headset and a method for informing a user of an incoming call signal using the same. A controller built in the main body detects an open or closed state of the boom according to an on/off state of the boom switch on condition that the power on/off switch is switched on, sets an incoming call indication mode to a ringing or melody mode if the boom is opened from the main body, sets an incoming call indication mode to a vibration mode if the boom is closed to the main body, and performing an incoming call indication operation at a predetermined incoming call indication mode upon receiving an incoming call signal from the outside. The vibration motor is built in the main body and vibrated upon receiving a control signal from the controller.

9 Claims, 8 Drawing Sheets

BLUETOOTH HEADSET AND METHOD FOR INFORMING USER OF INCOMING CALL SIGNAL USING THE SAME

BACKGROUND OF THE INVENTION

1. Field of the Invention

The present invention relates to a Bluetooth headset and a method for informing a user of an incoming call signal using the Bluetooth headset for use with communication terminals, and more particularly to a Bluetooth headset and a method for informing a user of an incoming call signal using the same, which implement a microphone boom in the form of an on/off switch, automatically switch an incoming call indication mode to a vibration or ringing mode according to on/off operations (i.e., switching operations) of the microphone boom, switch the incoming call indication mode to the vibration mode if a user does not wear the Bluetooth headset and the microphone boom is closed to a main body, and thus inform the user of an incoming call signal even though the user does not wear the Bluetooth headset.

2. Description of the Related Art

In recent times, following the current trend of rapidly developing wireless communication technologies throughout the world, a variety of low-cost and low-power wireless devices or wireless links have been widely used for wireless communication industries and computer industries. A representative example of such wireless communication technologies is Bluetooth wireless technology developed by Ericsson Corporation in Sweden. The Bluetooth wireless technology aims to provide a user or service provider with the convenience of mobility and convenient mobile services, and is especially designed to provide the user or service provider with a low-cost, high-strength, high-efficiency, and high-capacity mobile service such as networking between a voice signal and data. Typically, a variety of Bluetooth devices having Bluetooth modules operable within a predetermined distance of 10 m transmit a voice signal and data in real time over a wireless link. Because a Bluetooth module is generally manufactured in the form of a small-sized microchip, it can be readily adaptable for use with various kinds of communicators. The Bluetooth module is generally designed to be operated at a frequency bandwidth of 2.4 GHz at which a variety of communications are compatible with each other throughout the whole world.

The Bluetooth modules have been widely applied to communication terminals, computer peripherals, and household appliances, etc. A representative example of the Bluetooth module is a wireless headset or an earphone. The Bluetooth headset allows a user to hear a voice signal of a called party in the same way as a headphone, and at the same time allows the user to transmit his or her voice signal to the called party in the same way as a microphone, such that the Bluetooth headset used for such two-way voice signals is considered to be a two-way communication unit. Such a Bluetooth headset can be readily implemented at low cost using 2.4 GHz ISM (Industrial Scientific Medical) band. Although a transmission distance of 10 m has been widely applied to such a Bluetooth headset, the Bluetooth headset has a longer transmission distance of 100 m on the condition that an amplifier has been additionally mounted to the Bluetooth headset. A TDM (Time Division Multiplexing) scheme functions as a multiplexing method for the Bluetooth headset because the TDM scheme is cost-effective. The Bluetooth headset includes three synchronous channels and one asynchronous channel. A GFSK (Gaussian Frequency Shift Keying) scheme functions as a modulation method for the Bluetooth headset. A Circuit and Packet Switching scheme is adapted for the Bluetooth headset, and the Bluetooth headset forms a Piconet to create a communication path between a caller and a called party.

In recent times, there have been developed built-in Bluetooth modules for use in mobile phones (also called mobile terminals) such as cellular phones and PCS phones to enhance the efficiency of a short-distance communication between different voice processors or different data processors, for example, communication between a mobile terminal and a computer. Particularly, Bluetooth headsets newly introduced to the market are being developed to provide users with additional functions along with a basic voice communication function, resulting in greater convenience for the users.

Current widely used Bluetooth headsets are classified into two types, i.e., a first Bluetooth headset with a boom and a second Bluetooth headset having no boom, from the viewpoint of mechanical characteristics. In this case, if the boom is not used for such Bluetooth headset, it is partially overlapped with a main body (i.e., a boom's closed state) to reduce an overall size of the Bluetooth headset. In the case where the Bluetooth headset is worn on the user's ear and a call connection state is established between the user and the called party, the boom is opened from the main body (i.e., a boom's open state) to swing a microphone mounted to one end of the boom toward the user's mouth, thereby transmitting a voice signal of the user to the called party.

FIGS. 1a to 1c illustrate the appearance of a conventional wireless headset. Referring to FIGS. 1a to 1c, the wireless headset module 10 includes a flexible ear hook 12, an ear piece 13 connected at one end to the flexible ear hook 12, a speaker module 14 detachably connected to the ear piece, a speaker 24 positioned on one side of the speaker module 14, and a power on/off button 26 positioned on the opposite or other side of the speaker module 14. The wireless headset module 10 further includes a transceiver module 20 attached to the end of the ear hook 12 in an opposite direction from its point of attachment to the ear piece 13, volume control buttons 28 positioned on the back side of the transceiver module 20, a battery module 22 positioned at the end of the transceiver module 20 in an opposite direction from its point of attachment to the flexible ear hook 12, a boom 16 rotated with respect to the ear piece 13, and a microphone 18 positioned at one end of the boom 16.

The components 16, 13, 12, 20 and 22 are modular and can all be detached from each other and substitute components can be inserted as may be necessary for different configurations. The detailed description of the above conventional wireless headset is described in U.S. Pat. No. 6,230,029 issued on 8 May 2001, entitled "MODULAR WIRELESS HEADSET SYSTEM", which is incorporated herein by reference.

The aforementioned conventional wireless headset module wirelessly communicates with cellular phones, resulting in greater convenience for the user. However, the conventional wireless headset module is unable to inform a user of an incoming call signal.

FIG. 2 is a block diagram of a conventional wireless headset. The conventional wireless headset 10 is linked to a communication terminal 20 having a Bluetooth function, and serves as a supplementary communication terminal having a communicable Bluetooth module. The wireless headset 10 includes a speaker SPK, a microphone MIC, and a power on/off switch 11, etc., and communicates with other communication terminals having Bluetooth modules by means of its own Bluetooth module. The bluetooth module includes a controller 12 for controlling an overall control operation of the headset 10, an RF transceiver 13, and a voice processor 14, etc. The Bluetooth module is a module communicable with Bluetooth communication devices prescribed in Bluetooth standards. A prescribed interface such as a HCI (HostControl Interface) is defined between the Bluetooth modules, message packets associated with the prescribed interface are communicated between the Bluetooth modules, and thereby a variety of information, for example, a control command, result information of the control command, and user data information, is also communicated between the Bluetooth modules. The detailed description is described in Korean Patent Laid-open Publication No. 2003-0010213, which is incorporated herein by reference.

The aforementioned conventional wireless headset module wirelessly communicates with cellular phones, resulting in greater convenience for the user. However, this conventional wireless headset module is unable to inform a user of an incoming call signal.

The conventional Bluetooth headset modules shown in FIGS. 1 and 2 allow their speakers to ring or generate melody sound upon receiving an incoming call signal from the outside. Therefore, a user hears the output sound of the speaker, and actuates the "talk" button on the Bluetooth headset, thereby conducting a telephone conversation with other party.

Provided that the Bluetooth headset is worn on the user's ear, the user can recognize the incoming call signal because the user can audibly hear a ringing or melody sound indicating the incoming call signal. However, provided that the Bluetooth headset is put on or in a user's desk or pocket instead of being worn on the user's ear, the ringing or melody sound generated from a speaker of the Bluetooth headset is at a very low sound level, such that the user is unable to determine whether there is an incoming call signal.

SUMMARY OF THE INVENTION

Therefore, the present invention has been made in view of the above problems, and it is an object of the present invention to provide a Bluetooth headset for use with mobile terminals and a method for informing a user of an incoming call signal using the Bluetooth headset, which implement a microphone boom in the form of an on/off switch, automatically switch an incoming call indication mode to a vibration or ringing mode according to switching operations (i.e., on/off operations) of the microphone boom, switch the incoming call indication mode to the vibration mode if a user does not wear the Bluetooth headset and the microphone boom is closed to a main body, and thus inform the user of an incoming call signal even though the user does not wear the Bluetooth headset.

In accordance with one aspect of the present invention, the above and other objects can be accomplished by the provision of a Bluetooth headset for wirelessly communicating with a communication terminal having a Bluetooth function, comprising: a main body having a power on/off switch and a speaker; a boom being pivotably mounted to the main body and one end of which has a microphone attached thereon; a boom switch being switched on or off according to an open or closed state of the boom; a controller being built in the main body, for detecting an open or closed state of the boom according to an on/off state of the boom switch on condition that the power on/off switch is switched on, setting an incoming call indication mode to a ringing or melody mode if the boom is opened from the main body, setting an incoming call indication mode to a vibration mode if the boom is closed to the main body, and performing an incoming call indication operation at a predetermined incoming call indication mode upon receiving an incoming call signal from the outside; and a vibration motor being built in the main body and vibrated upon receiving a control signal from the controller.

In accordance with another aspect of the present invention, there is provided a method for informing a user of an incoming call signal in a Bluetooth headset wirelessly communicating a communication terminal 20 having a Bluetooth function, comprising the steps of: a) if the Bluetooth headset is powered on, detecting an open or closed state of a boom having a microphone; b) if the boom is opened from a main body contained in the Bluetooth headset, setting an incoming call indication mode to a ringing or melody mode; c) if the boom is closed to the main body, setting an incoming call indication mode to a vibration mode; and d) upon receiving an incoming call signal, informing a user of the incoming call signal at a predetermined incoming call indication mode.

BRIEF DESCRIPTION OF THE DRAWINGS

The above and other objects, features and other advantages of the present invention will be more clearly understood from the following detailed description taken in conjunction with the accompanying drawing, in which.

DESCRIPTION OF THE PREFERRED EMBODIMENTS

Figure 1A:
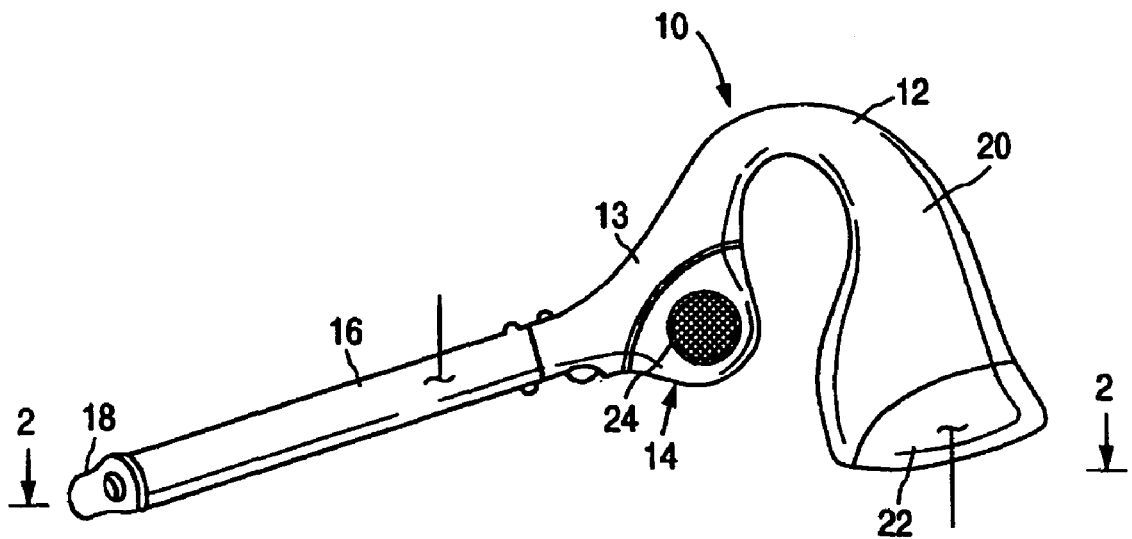
FIGS. 1a~1c are views illustrating the appearance of a conventional wireless headset.
Figure 1B:
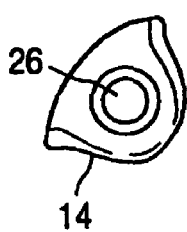
Figure 1C:
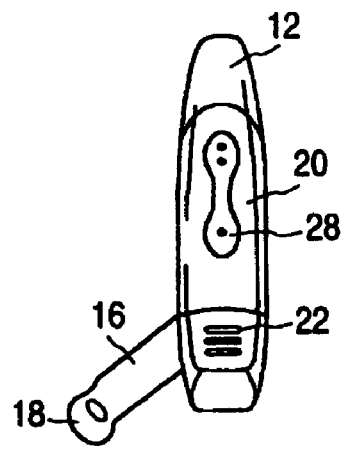
Figure 2:
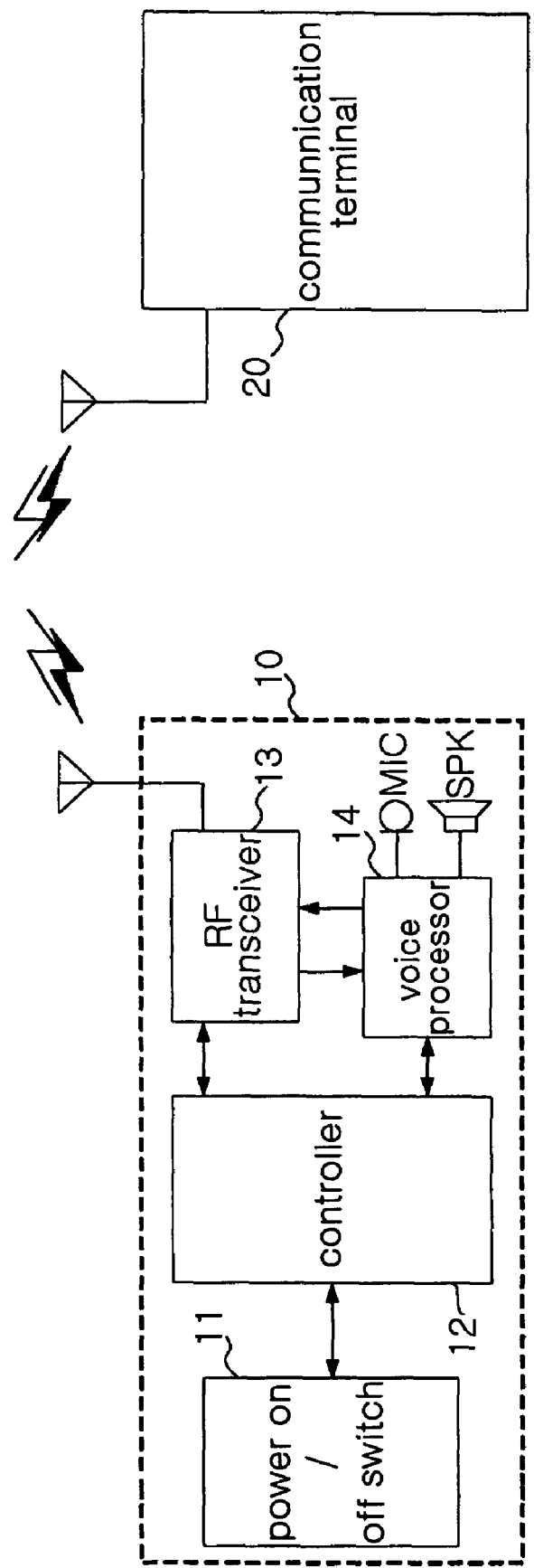
FIG. 2 is a block diagram of a conventional wireless headset.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

Figure 3:
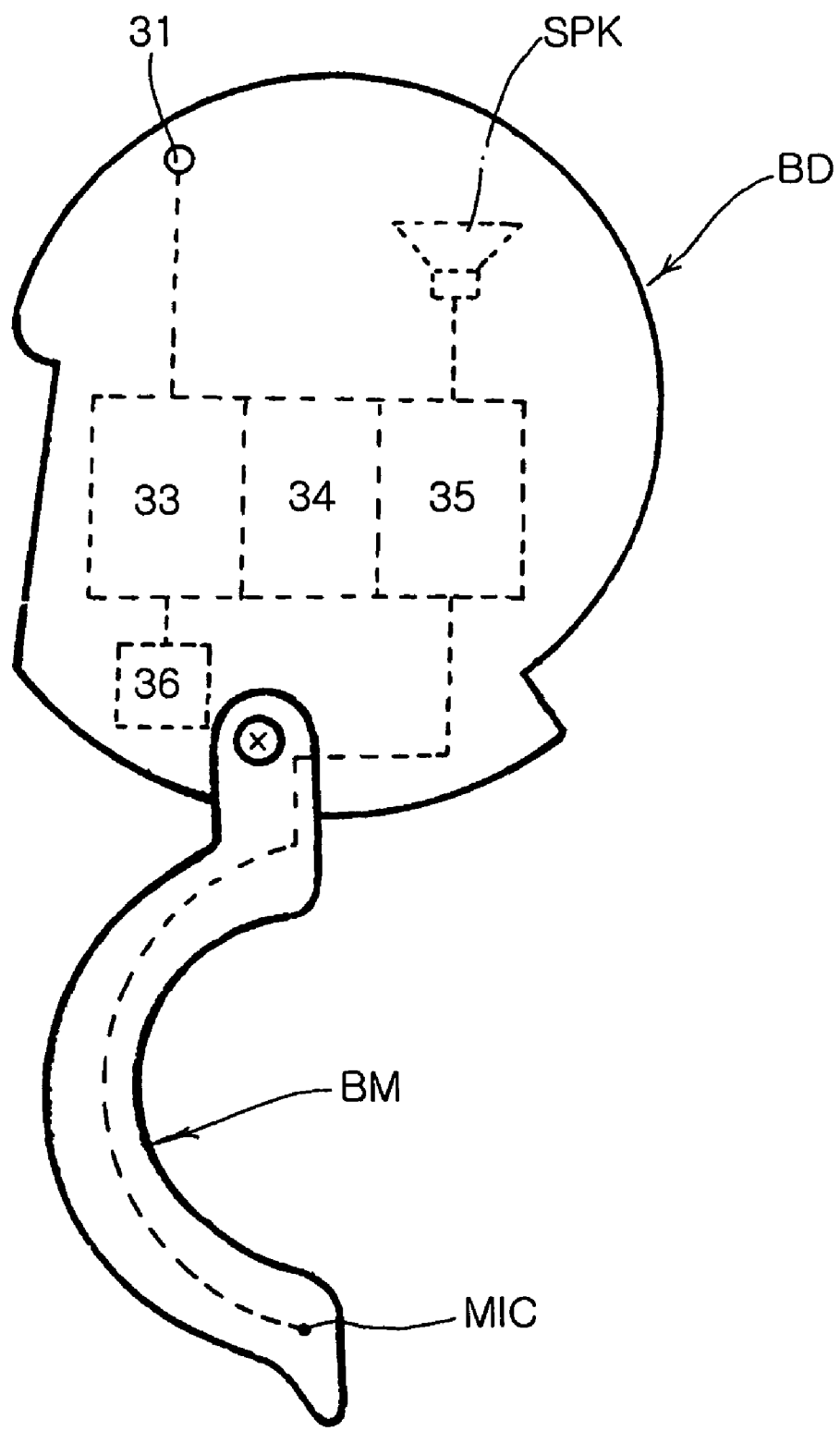
FIG. 3 is a view illustrating the appearance of a wireless headset according to the present invention.
Figure 4:
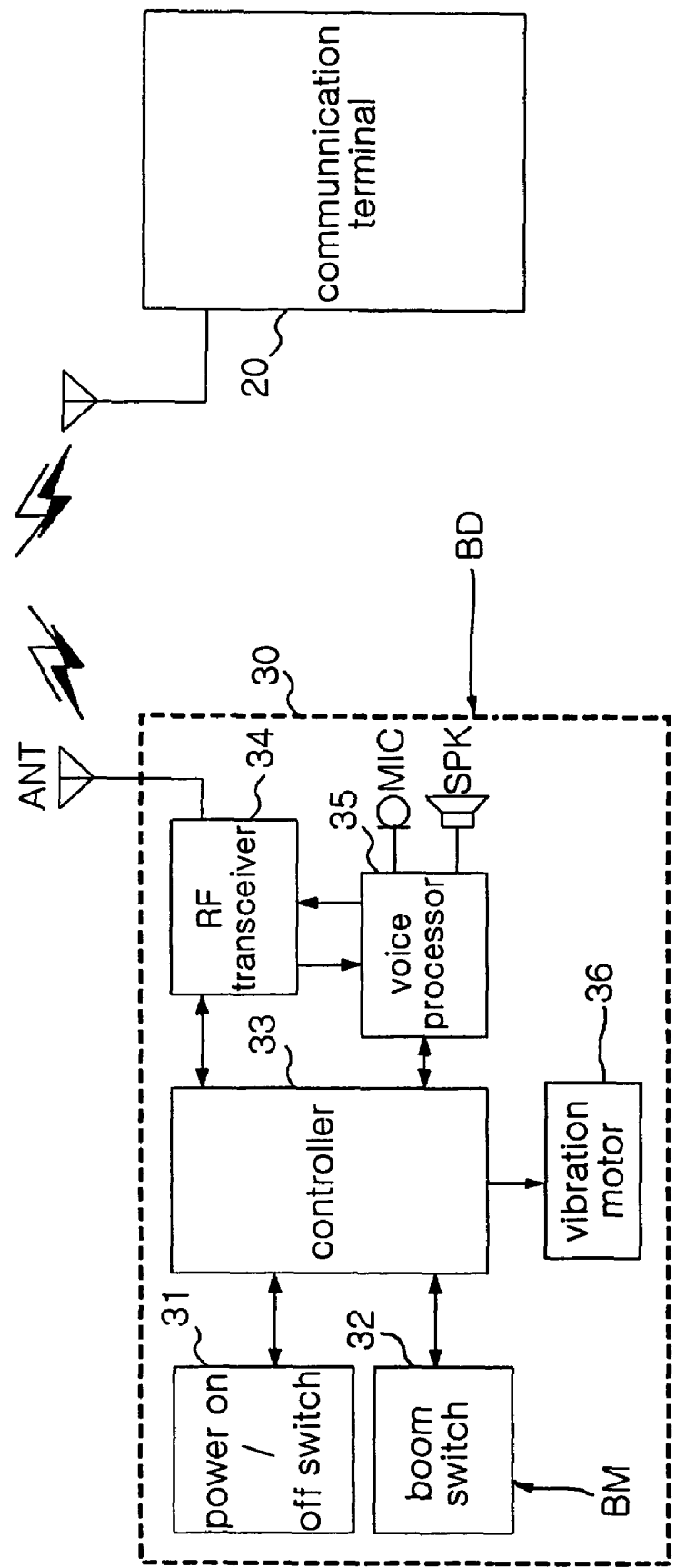
FIG. 4 is a block diagram of a wireless headset according to the present invention.

FIG. 3 is a view illustrating the appearance of a wireless headset according to the present invention. FIG. 4 is a block diagram of a wireless headset according to the present invention.

Referring to FIGS. 3 and 4, the Bluetooth headset 30 according to the present invention wirelessly communicates with a communication terminal 20 having a Bluetooth function. The Bluetooth headset 30 includes a main body BD having a power on/off switch 31 and a speaker SPK; a boom BM pivotably mounted to the main body BD and one end of which has a microphone attached thereon; a boom switch 32 switched on/off according to an open or closed state of the boom BM; a controller 33 built in the main body BD, for detecting an open or closed state of the boom BM according to an on/off state of the boom switch 32 on the condition that the power on/off switch has been switched on, setting an incoming call indication mode to a ringing or melody mode if the boom BM is opened from the main body BD, setting an incoming call indication mode to a vibration mode if the boom BM is closed to the main body BD, and performing an incoming call indication operation at a predetermined incoming call indication mode upon receiving an incoming call signal from the outside, and a vibration motor 36 built in the main body BD and vibrated upon receiving a control signal from the controller 33.

The boom switch 32 is switched on when the boom BM is opened from the main body BD, or is switched off when the boom BM is closed to the main body BD. Alternatively, the boom switch 32 may be switched off when the boom BM is opened from the main body BD, or may be switched on when the boom BM is closed to the main body BD.

In the case where an incoming call indication mode is previously set to a ringing or melody mode and the controller 33 receives an incoming call signal, the controller 33 begins to count a predetermined time T1 during which a ringing or melody sound is generated, and at the same time controls the output of the ringing or melody sound generated from the speaker SPK, and drives the vibration motor 36 if the counted time T1 is longer than a predetermined first time ST1.

In the case where an incoming call indication mode is previously set to a ringing or melody mode and the controller 33 receives an incoming call signal, the controller 33 begins to count a predetermined time T1 during which a ringing or melody sound is generated, and at the same time controls the output of the ringing or melody sound generated from the speaker SPK. If the counted time T1 is longer than a predetermined first time ST1, the controller 33 drives the vibration motor 36 for a predetermined time during which the incoming call signal is received.

Figure 5A:
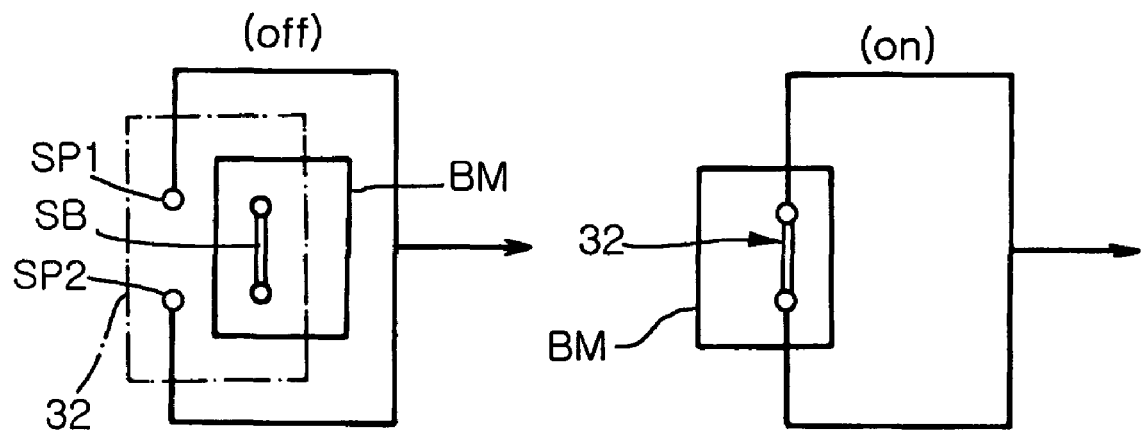
FIGS. 5a~5b are equivalent circuit diagrams of a boom switch shown in FIG. 4 according to the present invention.
Figure 5B:
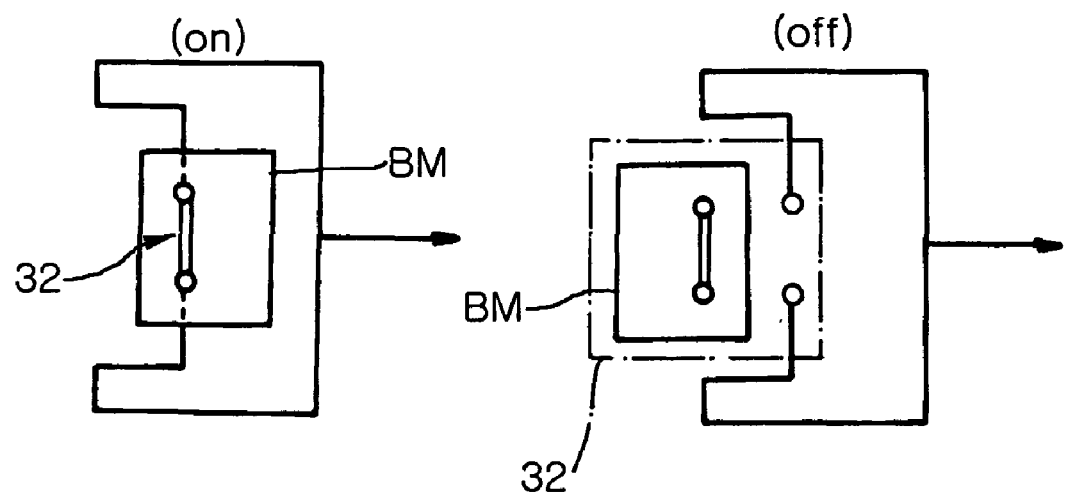

FIGS. 5a~5b are equivalent circuit diagrams of a boom switch shown in FIG. 4 according to the present invention. Referring to FIGS. 5a~5b. In FIG. 5a, the boom switch 32 is switched off under the condition the boom BM is closed to a main body, whereas it is switched on under the condition that the boom BM is opened from the main body. In FIG. 5b, the boom switch 32 is switched on under the condition the boom BM is closed to the main body, whereas it is switched off under the condition that the boom BM is opened from the main body.

Figure 6A:
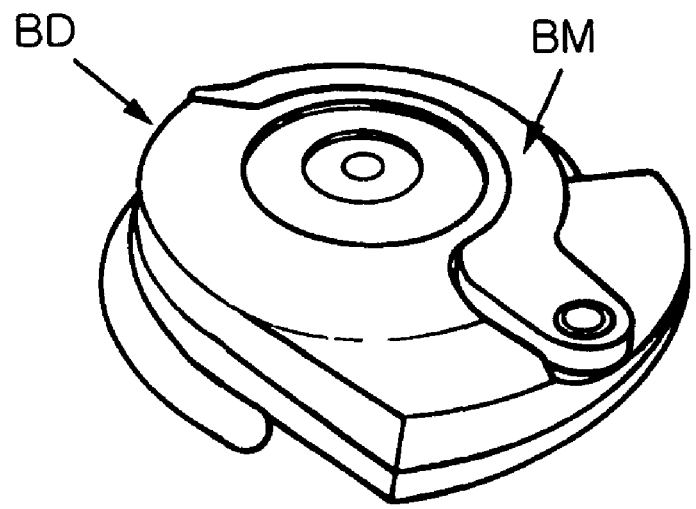
FIGS. 6a~6b are the appearance of a closed state of the boom switch and the appearance of an open state of the boom switch according to the present invention.
Figure 6B:
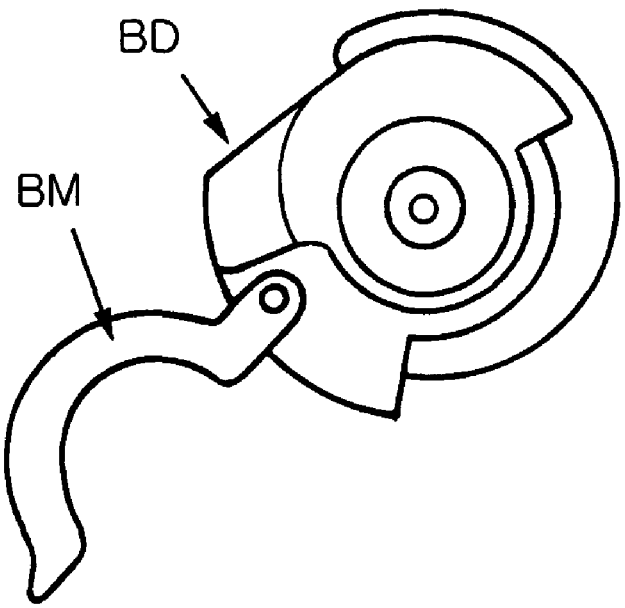

FIGS. 6a~6b are the appearance of a closed state of the boom switch and the appearance of an open state of the boom switch according to the present invention. In more detail, FIG. 6a shows the appearance of a closed state of the boom, and FIG. 6b shows the appearance of an open state of the boom BM.

The detailed description of the present invention will hereinafter be described in detail with reference to FIGS. 3 to 7.

The Bluetooth headset 30 is a wireless headset or an earphone, and wirelessly communicates with a communication terminal 20 such as a cellular phone, a PCS phone, and other mobile phone. For example, in the case where a cellular phone receives an incoming call signal from the outside under the condition the Bluetooth headset is adapted to wirelessly communicate with the cellular phone, the cellular phone wirelessly transmits the incoming call signal to the Bluetooth headset, such that the Bluetooth headset informs a user of the cellular phone of the incoming call signal.

Figure 7:
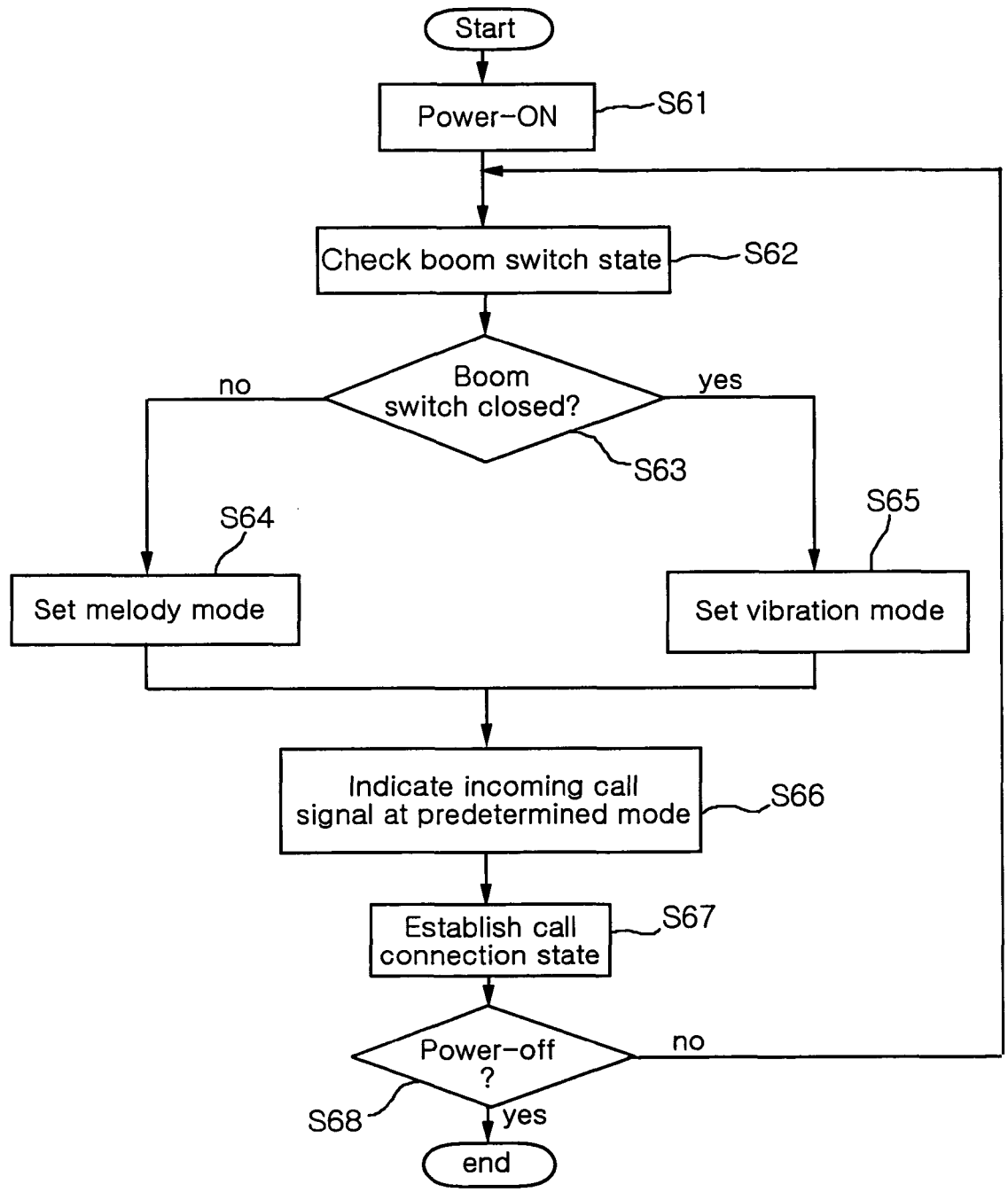
FIG. 7 is a flow chart illustrating a method for informing a user of an incoming call signal using the wireless headset according to the present invention.

FIG. 7 is a flow chart illustrating a method for informing a user of an incoming call signal using the wireless headset according to the present invention.

Referring to FIGS. 3 to 7, if a power on/off switch 31 of the Bluetooth headset 30 is switched on, the controller 33 of the Bluetooth headset 30 determines an open or closed state of the boom BM having a microphone MIC at steps S61 to S63.

In this case, the boom BM is pivotably mounted to the main body BD, and is thus pivotably moved in only one axis. In more detail, the boom BM is closed to the main body BD as shown in FIG. 6a when it is not worn by a user, but is opened from the main body BD as shown in FIG. 6b when it is worn by the user.

Referring back to FIG. 5a, in the case where the user terminates a call connection state with other party after having a telephone conversation with the other party using the Bluetooth headset, separates the Bluetooth headset from the user's ear, and is closed to the main body BD, a contact piece SB attached on the boom BM is separated from contacts SP1 and SP2. In this case, the controller 33 of the Bluetooth headset 30 receives an electric potential signal varying with an on/off state of the boom switch 32 from the contacts SP1 and SP2, and determines a current state (i.e., an open or closed state) of the boom BM on the basis of the electric potential signal.

As can be seen from the aforementioned coupling states of the boom BM, the boom switch 32 may be switched on or off if needed. The controller 33 recognizes a closed state of the boom BM upon receiving the boom switch 32's information indicating the closed state of the boom BM, and recognizes an open state of the boom BM upon receiving the boom switch 32's information indicating the open state of the boom BM.

Thereafter, if the controller 33 determines that the boom BM is opened from the main body BD, it sets an incoming call indication mode to a ringing or melody mode at step S64. If the controller 33 determines that the boom BM is closed to the main body BD, it sets an incoming call indication mode to a vibration mode at step S65. In more detail, if the boom BM is in a closed state, then the controller 33 sets an incoming call indication mode to a vibration mode. If the boom BM is in an open state, then the controller 33 sets an incoming call indication mode to a ringing or melody mode.

After setting up the incoming call indication mode, if an incoming call signal from the communication terminal 20 is transmitted to the controller 33 through an antenna ANT and an RF transceiver 34, the controller 33 performs an incoming call indication operation at a predetermined incoming call indication mode upon receiving an incoming call signal from the outside at step S66.

The detailed description of an incoming call indication operation according to the present invention will hereinafter be described in detail.

According to a preferred embodiment of such an incoming call indication operation, if the controller 33 receives an incoming call signal from the communication terminal 20 through the antenna ANT and the RF transceiver 34 under the condition that an incoming call indication mode is previously set to a ringing or melody mode, the controller 33 controls the output of ringing or melody sound for a predetermined time ST1, such that the speaker SPK outputs the ringing or melody sound indicating an incoming call signal. During the output time of such ringing or melody sound, if the boom BM is not worn by the user even though it is in an open state, and then a predetermined time elapses, the controller 33 controls a vibration function to actuate the vibration motor 36, such that the vibration motor 36 informs a user of the incoming call signal through its vibration.

The controller 33 controls the vibration function during reception of the incoming call signal, such that the vibration motor 36 is operated to inform the user of the incoming call signal.

As described above, the Bluetooth headset 30 determines that an open state of the boom BM indicates the Bluetooth headset being worn by the user, such that the user can recognize an incoming call signal even though a melody sound is at a very low level, and thus an incoming call indication mode is set to a ringing or melody mode. On the other hand, the Bluetooth headset 30 determines that a closed state of the boom BM indicates the Bluetooth headset not being worn by the user, such that the user is unable to recognize an incoming call signal at a melody sound of a very low level, and thus an incoming call indication mode is set to a vibration mode.

Figure 8:
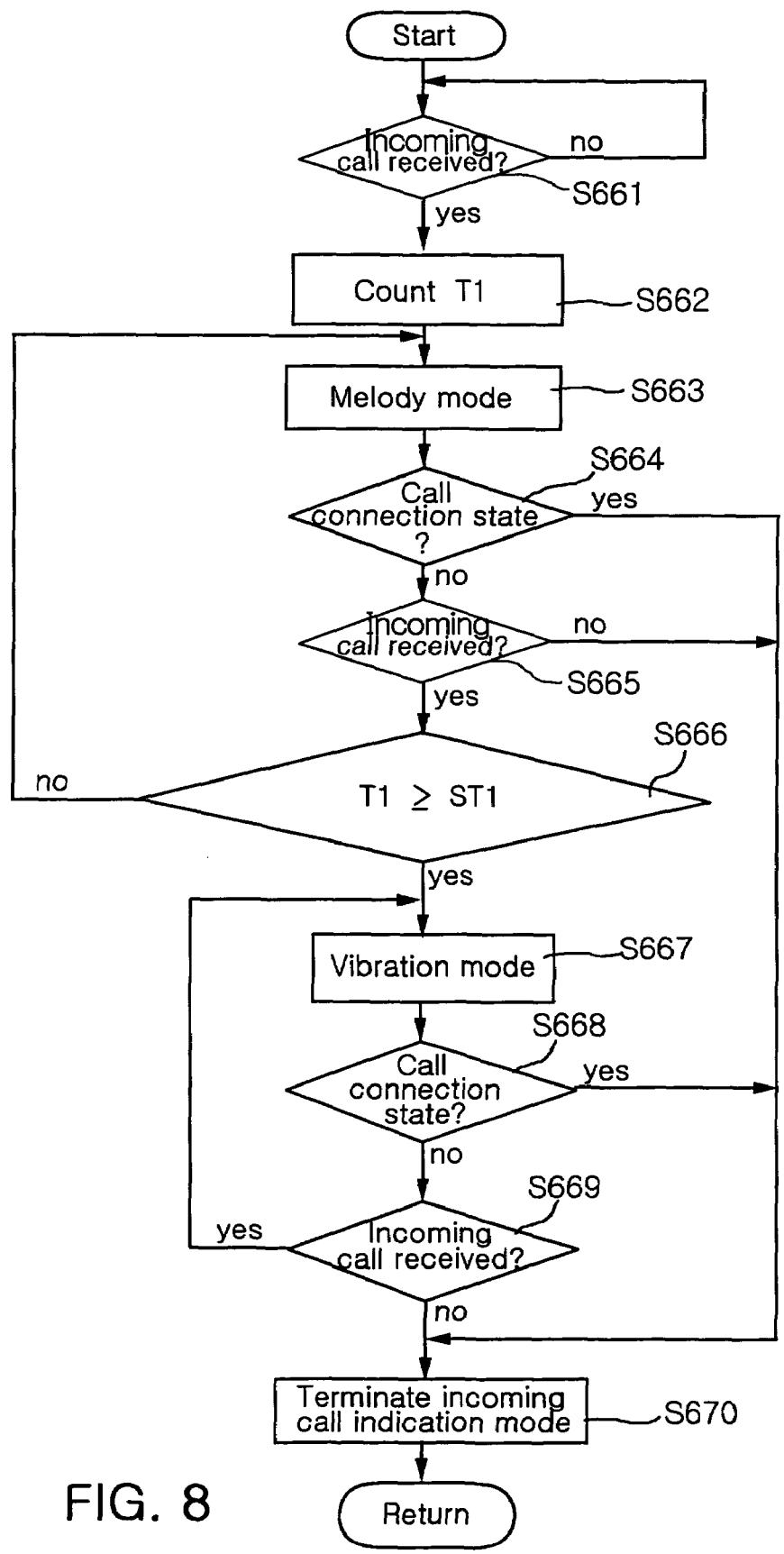
FIG. 8 is a flow chart illustrating the incoming call indication method shown in FIG. 7 according to the present invention.

FIG. 8 is a flow chart illustrating the incoming call indication method of FIG. 7 according to the present invention. The incoming call indication step S66 shown in FIG. 7 will hereinafter be described in more detail with reference to FIG. 8.

The controller 33 determines whether an incoming call signal is received from the communication terminal 20 at step S661 under the condition that an incoming call indication mode is previously set to a ringing or melody mode. Upon receiving the incoming call signal at step S661, the controller 33 begins to count a predetermined time T1 during which a ringing or melody sound is generated at step S662, and controls the output level of ringing or melody sound generated from the speaker SPK at step S663.

In the case where a call connection state between a caller and a called party is not established at step S664 and the incoming call signal is received at the Bluetooth headset at step S665 while the ringing or melody sound is generated, the controller 33 determines at step S666 whether the counted time T1 is longer than a predetermined time ST1. If it is determined at step S666 that the counted time T1 is longer than a predetermined time ST1, the vibration motor 36 is operated at step S667. Then, if a call connection state between a caller and a called party is established or an incoming call signal is not received, an incoming call indication mode is terminated.

In the case of a vibration mode, the controller 33 determines whether the incoming call signal is received under the condition that a call connection state between a caller and a called party is not established at steps S668 and S669. If the incoming call signal is received even though a call connection state between the caller and the called party is not established, the vibration motor 36 is continuously operated. If a call connection state between the caller and the called party is established or the incoming call signal is not received, the incoming call indication mode is terminated at step S670.

A vibrator is applied to the Bluetooth headset with a boom BM in the present invention. The boom BM is closed to a main body BD when the Bluetooth headset is not used, such that the Bluetooth headset is automatically set to a vibration mode. Otherwise, if the boom BM is opened from the main body BD, the Bluetooth headset is automatically switched to a ringing or melody mode.

On the other hand, the Bluetooth headset may not be worn on the user's ear even though the boom BM is opened from the main body BD (i.e., a ringing or melody mode). In order to prevent such an unworn condition of the Bluetooth headset, the present invention previously sets up a predetermined time during which a melody sound is created. Therefore, if the melody sound is continuously generated after the lapse of the predetermined time, the present invention determines that the Bluetooth headset is not worn on the user's ear even though the boom BM is opened from the main body, and thus automatically performs a vibration mode.

The communication terminal applied to the present invention may further include mobile terminals such as cellular phones, etc.

As apparent from the above description, the present invention provides a Bluetooth headset for use with mobile terminals and a method for informing a user of an incoming call signal using the Bluetooth headset, which implement a microphone boom in the form of an on/off switch, automatically switch an incoming call indication mode to a vibration or ringing mode according to switching operations of the microphone boom, switch the incoming call indication mode to the vibration mode if a user does not wear the Bluetooth headset and the microphone boom is closed to a main body, and thus inform the user of an incoming call signal even though the user does not wear the Bluetooth headset.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A Bluetooth headset for wirelessly communicating with a communication terminal having a Bluetooth function, comprising:
   a main body having a power on/off switch and a speaker;
   a boom being pivotably mounted to the main body and one end of which has a microphone attached thereon;
   a boom switch being switched on or off according to an open or closed state of the boom;
   a controller being built in the main body, for detecting an open or closed state of the boom according to an on/off state of the boom switch on condition that the power on/off switch is switched on, setting an incoming call indication mode to a ringing or melody mode if the boom is opened from the main body, setting an incoming call indication mode to a vibration mode if the boom is closed to the main body, and performing an incoming call indication operation at a predetermined incoming call indication mode upon receiving an incoming call signal from the outside; and
   a vibration motor being built in the main body and vibrated upon receiving a control signal from the controller.

2. The Bluetooth headset as set forth in claim 1, wherein the boom switch is switched on when the boom is opened from the main body, or is switched off when the boom is closed to the main body.

3. The Bluetooth headset as set forth in claim 1, wherein the boom switch is switched off when the boom is opened from the main body, or is switched on when the boom is closed to the main body.

4. The Bluetooth headset as set forth in claim 1, wherein the controller counts a predetermined time during which a ringing or melody sound is generated when the incoming call indication mode is previously set to the ringing or melody mode, at the same time controls an output of the ringing or melody sound generated from the speaker, and drives the vibration motor if the counted time is longer than a predetermined first time.

5. The Bluetooth headset as set forth in claim 1, wherein the controller counts a predetermined time during which a ringing or melody sound is generated when the incoming call indication mode is previously set to the ringing or melody mode, at the same time controls an output of the ringing or melody sound generated from the speaker, and drives the vibration motor for a predetermined time during which the incoming call signal is received if the counted time is longer than a predetermined first time.

6. A method for informing a user of an incoming call signal in a Bluetooth headset wirelessly communicating a communication terminal having a Bluetooth function, comprising the steps of:
   a) if the Bluetooth headset is powered on, detecting an open or closed state of a boom having a microphone;
   b) if the boom is opened from a main body contained in the Bluetooth headset, setting an incoming call indication mode to a ringing or melody mode;
   c) if the boom is closed to the main body, setting an incoming call indication mode to a vibration mode; and
   d) upon receiving an incoming call signal, informing a user of the incoming call signal at a predetermined incoming call indication mode.

7. The method as set forth in claim 6, wherein the step (d) includes the steps of:
   d1) upon receiving the incoming signal on condition that the incoming call indication mode is set to the ringing or melody mode, generating a ringing or melody sound for a predetermined time; and
   d2) performing the vibration mode after the lapse of the predetermined time.

8. The method as set forth in claim 7, wherein the step (d) further includes the step of:
   d3) if the incoming call signal is not received while generating the ringing or melody sound in the ringing or melody mode, terminating an incoming call indication operation.

9. The method as set forth in claim 7, wherein the step (d) further includes the step of:
   d4) if the incoming call signal is not received in the vibration mode, terminating an incoming call indication operation.

* * * * *